United States Patent [19]

Domenget et al.

[11] Patent Number: 4,977,491

[45] Date of Patent: Dec. 11, 1990

[54] HIGH FREQUENCY TRANSFORMER WITH A PRINTED CIRCUIT WINDING IN PARTICULAR FOR A VERY HIGH VOLTAGE POWER SUPPLY

[75] Inventors: Jean-Pierre Domenget, Garches; Gérard Lorec, Bourg La Reine, both of France

[73] Assignee: Electronique Serge Dassault, France

[21] Appl. No.: 273,666

[22] Filed: Nov. 18, 1988

Related U.S. Application Data

[63] Continuation of Ser. No. 76,356, Jul. 22, 1987, abandoned.

[30] Foreign Application Priority Data

Oct. 15, 1986 [FR] France ................................ 86 14336

[51] Int. Cl.[5] ........................ H02M 3/00; H01F 27/30

[52] U.S. Cl. ...................................... 363/15; 336/183; 336/184; 336/200; 336/232

[58] Field of Search ...................... 363/15, 20, 68, 126, 363/21; 336/232, 200, 185, 83, 184, 183, 205

[56] References Cited

U.S. PATENT DOCUMENTS

| | | | |
|---|---|---|---|
| 2,988,715 | 6/1961 | Gizynski et al. | 336/92 X |
| 3,238,480 | 3/1966 | Killonan | 336/200 X |
| 3,419,834 | 12/1968 | McKechnie et al. | 336/232 X |
| 3,851,287 | 11/1974 | Miller et al. | 336/183 X |
| 3,904,928 | 9/1975 | Sawada et al. | 336/185 |
| 4,012,703 | 3/1977 | Chamberlayne | 336/200 X |
| 4,039,924 | 8/1977 | Scales et al. | 336/185 X |
| 4,066,955 | 1/1978 | Sothers | 363/68 |
| 4,201,965 | 5/1980 | Onyshkerych | 336/200 X |
| 4,517,540 | 5/1985 | McDougal | 336/205 |
| 4,547,961 | 10/1985 | Bokil et al. | 336/200 X |
| 4,622,627 | 11/1986 | Rodriguez et al. | 363/21 X |

FOREIGN PATENT DOCUMENTS

| | | | |
|---|---|---|---|
| 2409881 | 9/1975 | Fed. Rep. of Germany | 336/83 |
| 2917388 | 11/1980 | Fed. Rep. of Germany | 336/200 |
| 1185354 | 7/1959 | France | 336/200 |
| 993265 | 5/1965 | United Kingdom | 336/200 |
| 1494087 | 12/1977 | United Kingdom | 336/200 |

OTHER PUBLICATIONS

IBM Technical Disclosure Bulletin, "Multiple Output Planar Transformer", Wallace, vol. 24, No. 8, Jan. 1982, pp. 4287–4290.

1-MHz Resonant Converter Power Transformer is Small, Efficient, Economical, Alex Estrov, PCIM, Power Conversion Intelligent Motion, Intertech Communication, Aug. 1986, pp. 14+.

*Primary Examiner*—Thomas J. Kozma
*Attorney, Agent, or Firm*—Handal & Morofsky

[57] ABSTRACT

A high frequency transformer is made on a magnetic circuit which can be of a generally square shape. The secondary windings are made on printed circuit plates, separated by insulators and traversed perpendicularly by the core or cores of the magnetic circuit. The primary winding can be wound directly on such a core. The transformer is applicable in particular to high frequency very high voltage power supplies, in particular of the type termed "flyback" power supplies.

19 Claims, 3 Drawing Sheets

PRIOR ART

HIGH FREQUENCY TRANSFORMER WITH A PRINTED CIRCUIT WINDING IN PARTICULAR FOR A VERY HIGH VOLTAGE POWER SUPPLY

This application is a continuation of application Ser. No. 076,356, now abandoned, filed July 22, 1987.

FIELD OF THE INVENTION

The invention concerns transformers and in particular those having to work at a very high voltage.

PRIOR ART

Obtaining a very high voltage power supply operating at a high frequency, and of small size, leads to a transformer having the following essential specifications:

a plurality of secondary windings with rectification for each secondary and series arrangement of the voltages in each unit thus obtained to constitute the high voltage;

a transformation ratio between the primary and each secondary which should be close to 1, for in a transformer with a ratio of 1 the induced alternating voltages are weak and the unwanted inductive elements are minimal.

The various known solutions have disadvantages which will be discussed in greater detail below. The essential object of the invention is to provide a new type of transformer making it possible to obtain excellent electrical performance figures, as small a size as possible and which should at the same time be straightforward to manufacture industrially.

In the article entitled "1MHz Resonant Converter Power Transformer is Small, Efficient, Economical", Alex Estrov, Multisource Technology Corporation, PCIM, Power Conversion Intelligent Motion, Inlertech Communication, Venlura, Calif. August, 1986, a high frequency transformer is proposed which comprises a magnetic circuit, and at least one primary winding and secondary windings, at least some of these windings being constituted by flat conductors deposited on an insulating substrate.

OBJECT OF THE PRESENT INVENTION

The transformer described in this prior document, although working at high frequencies, has a very special structure which does not allow a high voltage to be obtained in a simple manner. It is therefore an object of the present invention to provide a simpler high frequency transformer having the elements set out above in common with the earlier transformer.

SUMMARY OF THE INVENTION

The transformer in accordance with the invention is distinguished in that its magnetic circuit is of generally rectangular shape and in that the secondary windings are engraved on flat insulating substrates (printed circuits, or yet again, hybrid circuits), traversed perpendicularly by the core or cores of the magnetic circuit. Advantageously, the printed circuit plates, or at least some of them, are separated by insulating plates.

In an advantageous embodiment, each plate comprises two windings which are concentric with the zone for the passing of the parallel cores of the magnetic circuit, this zone most frequently being a circle.

In accordance with another aspect of the invention, each winding comprises several turns, the electric return line being ensured on the other side of the printed circuit.

According to yet another aspect of the invention, the secondary windings are united in a resin block moulded on bars whose cross section corresponds to the size of the parallel cores of the magnetic circuit, equipped with the primary winding or windings.

According to a variant of the invention, the primary windings are themselves also made in the form of printed circuit boards, traversed perpendicularly by the core or cores of the magnetic circuit. It is advantageous for the primary windings to alternate with the secondary windings.

BRIEF DESCRIPTION OF THE DRAWINGS

Other characteristics and advantages of the invention will become apparent by studying the following detailed description and the attached drawings, wherein.

DESCRIPTION OF THE PREFERRED EMBODIMENTS

The attached drawings show elements of a specific and/or geometric character at various points. Therefore, they can be used not only to render the following description more readily understood, but also to contribute to the definition of the invention a far as is necessary.

Figure 1:
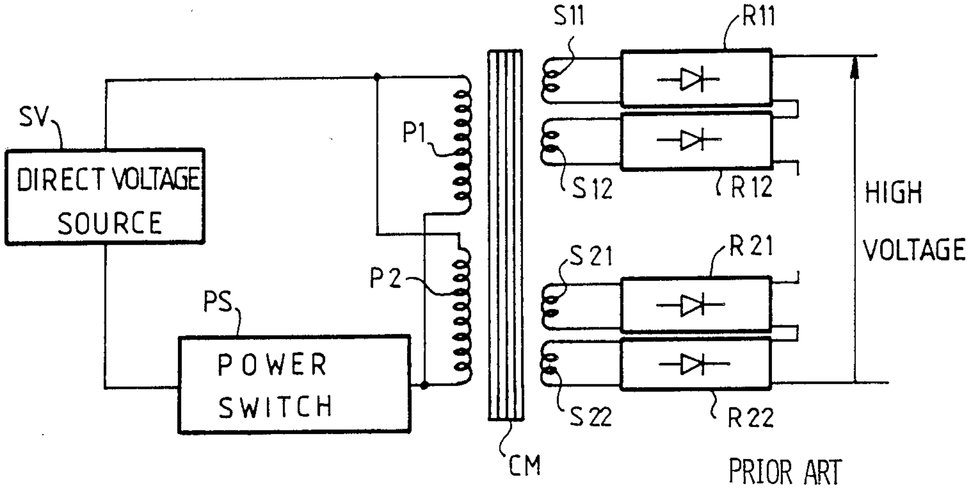
FIG. 1 recalls the electric circuit diagram of a known type of a high frequency very high voltage power supply.

The high frequency, high voltage power supply of FIG. 1 comprises a direct voltage source SV connected by means of a power switch PS to two primary windings P1 and P2 mounted in parallel and magnetically linked to a magnetic circuit CM.

In the magnetic circuit CM, there are mounted pairs of secondary windings such as S11, S12, . . . S21, S22. These secondary windings are individually connected to rectifiers R11, R12,....R21, R22. The outputs of the rectifiers mounted in series supply a high voltage.

The rectification is by half wave rectification for a flyback power supply.

The expert will understand that a large number of such secondary windings is necessary to obtain a high voltage.

Figure 2:
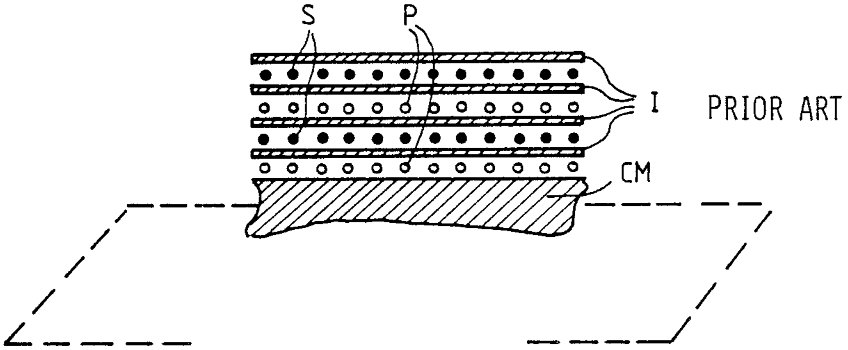
FIG. 2 is a drawing in a schematic cross section of a first known transformer capable of serving in the power supply of FIG. 1.

In a known transformer, such as schematically represented in FIG. 2, the winding is obtained on a sandwich construction in the magnetic circuit CM (represented in part only). In fact, based on this magnetic circuit, there will be, in sequence, a primary winding P, an insulator I, a secondary winding S, an insulator I, another primary winding P, an insulator I, another secondary winding S, another insulator I and so on. The primary windings are in parallel and their secondary windings are mounted in series after rectification.

This technique ensures a good flux linkage between the primary windings and the secondary windings. However, in the case of a transformer intended for a flyback power supply, as illustrated in FIG. 1, the secondaries are not always at the same distance from the magnetic core and therefore do not recover the same energy. This results in an imbalance in the voltages obtained from the various secondaries which renders this set-up difficult to use for a flyback power supply.

Figure 3:
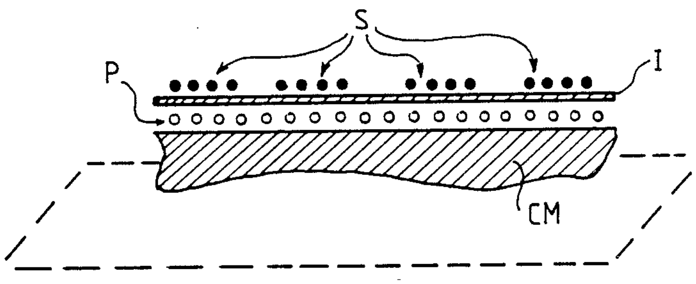
FIG. 3 is a schematic cross sectional drawing of another known transformer capable of serving in the power supply of FIG. 1.

Another type of known transformer is illustrated in FIG. 3. It will now be seen that, in order to eliminate the above mentioned drawback, all the primary windings P are wound together on the magnetic core CM. After the interposition of an insulator I, all the secondary windings S are wound side by side.

The drawback encountered with such a transformer is that all the secondary windings which are side by side must moreover be interspaced for reasons of insulation, which makes the transformer very long.

Moreover, for the two types of windings of the transformers illustrated in FIGS. 2 and 3, the number of winding conductors which are fine and fragile by nature, is considerable. The reliability of the transformer thus obtained is therefore relatively low, apart from the disadvantage that its industrial manufacture is difficult and it is therefore expensive.

Figure 4:
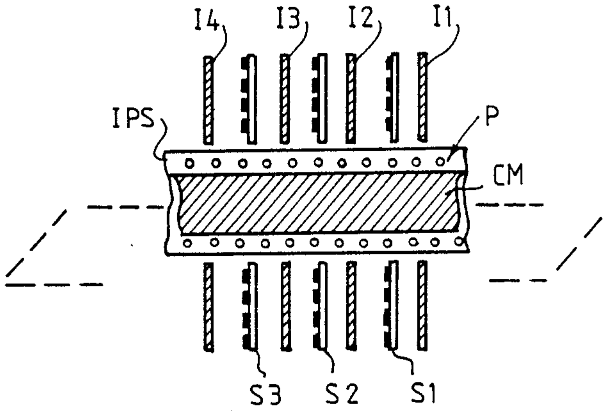
FIG. 4 is a first embodiment currently preferred, of the transformer according to the invention also illustrated in a schematic cross section.

FIG. 4 illustrates a first embodiment of a transformer according to the invention. The magnetic circuit is here constituted by a core CM on which are wound the primary winding P or windings with the interposition of an insulator (not shown). On the other hand, the secondary windings are made on printed circuit boards which extend perpendicularly to the core of the magnetic circuit CM and are separated from the primary windings by an insulating sleeve IPS, for instance, a cylindrical one. Thus, the secondary windings S1, S2, S3 are in the gaps between electrically insulating plates I1, I2, I3, I4 which are also perpendicular to the general direction of the magnetic core CM.

Making the secondary windings as a printed circuit ensures an absolute identity of the forms and geometry for all the secondaries. Moreover, each secondary winding is positioned identically in relation to not only the magnetic circuit, but also to the primary windings and the other secondary windings. This concept guarantees identical induced voltages at the terminals of each of the secondary windings. Finally, the output turns of the secondary windings are not winding conductors but flexible wires soldered on to the printed circuit. The reliability of the transformer is thereby improved in a significant way.

As for the electrical properties, the stray capacitances between the secondaries are identical and, moreover, reproducible from one transformer to another. Moreover, since each secondary winding is connected to a rectifier unit, the potential differences between the secondaries is a constant direct voltage equal to the rectified unitary voltage. The insulator is therefore subjected to a low direct voltage, as well as to an alternating voltage which is practically zero; this increases the life of the transformer.

Moreover, in a conventional transformer, the axial distance between two adjacent turns is equal to twice the thickness of the insulating enamel of the wire. A high frequency transformer has few turns and the voltage between two contiguous turns is therefore high. It follows therefrom that a high frequency stray current is produced and induces losses due to the high frequency operation of the insulators. It has been shown that the making of printed circuit secondary windings greatly attenuates this effect because the distance between the turns is increased and the facing surfaces are very small because of the small thickness of the engraving, the essential portion of the conductive cross section being provided in the direction perpendicular to this thickness.

Moreover, the perpendicular positioning of the primary windings on the one hand and of the secondary windings on the other hand makes it possible to reduce the stray capacitance between the primary or primaries and the secondaries. The operating frequency of the high frequency high voltage power supply or converter can therefore be raised, which improves the performance figures.

Finally, the stray currents induced in the turns by the magnetic flux leakage of the magnetic circuit are considerably reduced because of (a) the distance between the magnetic core and the turns and (b) the low thickness of the printed conductor tracks which here again are perpendicular to the leakage flux in their larger dimension in cross section.

Figure 5:
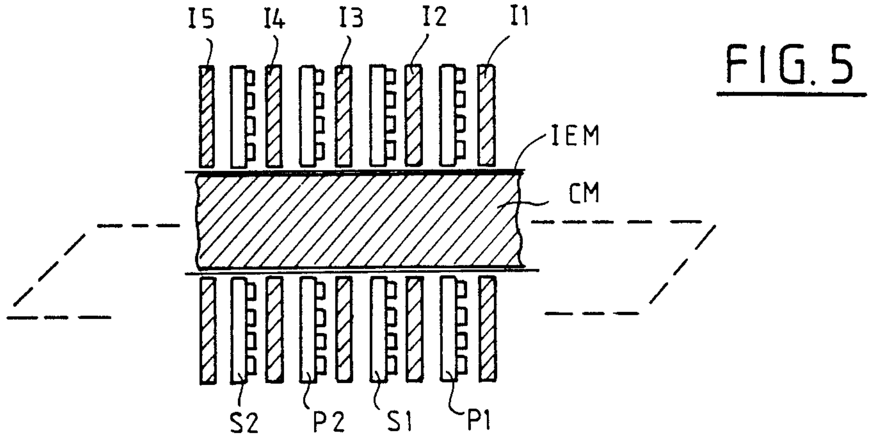
FIG. 5 is a variant of the embodiment of a transformer according to the invention.

Another embodiment of the invention may be seen in FIG. 5. In this embodiment, the insulators I1, I2, I3, I4, I5 are again present but they separate primary windings P1 and P2 alternating with secondary windings S1 and S2.

If required, a sleeve IEM insulates the magnetic circuit from the windings, and above all this allows the windings to be held in position during the casting of a potting resin.

This somewhat different embodiment has most of the advantages set out above, apart from the one resulting from the perpendicularity of the primary winding and of the secondary windings.

Figure 7:
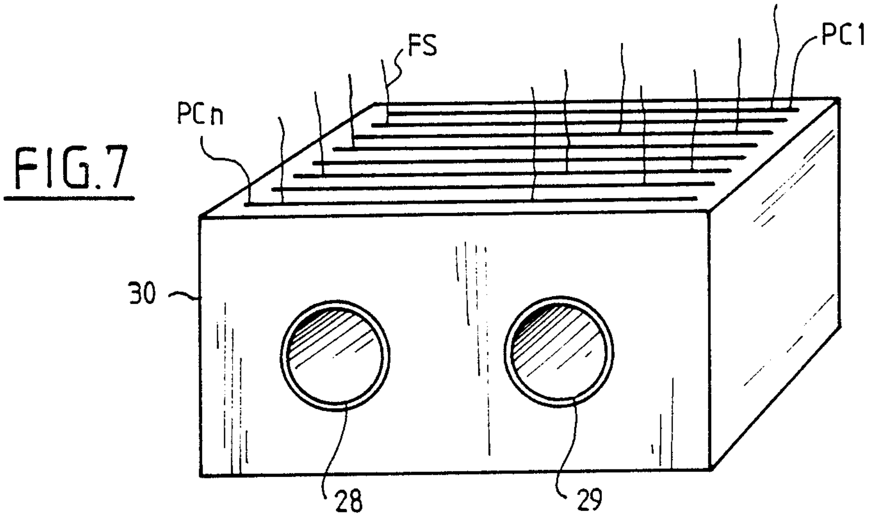
FIG. 7 a view in perspective illustrating the block of the secondary windings of the particular transformer in accordance with the invention.
Figure 8:
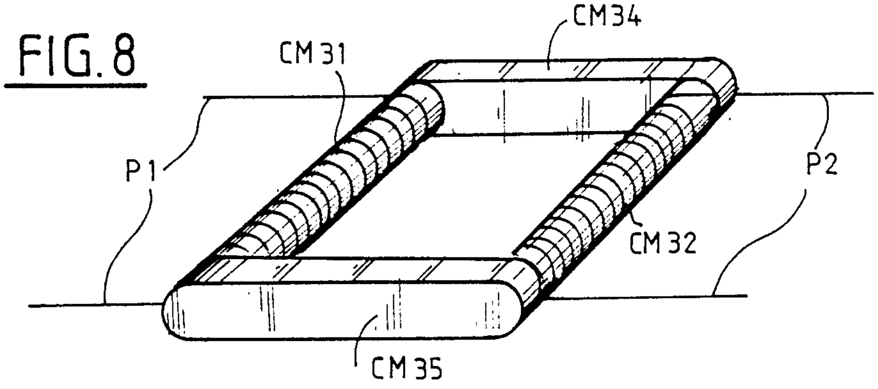
FIG. 8 illustrates the magnetic circuit and the primary windings intended to cooperate with the block of the secondary windings of FIG. 7.

A preferred embodiment of the invention will now be described with reference to FIGS. 6 to 8.

Figure 6:
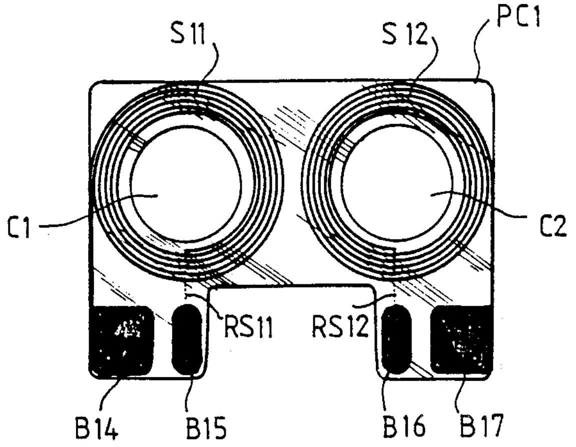
FIG. 6 is the circuit diagram of a printed circuit board which can be used in a particular transformer in accordance with the invention.

FIG. 6 illustrates an elementary printed circuit board PC1 having two spiral windings S11 and S12. The outer turn of the spiral winding S11 is connected to a terminal B14, whilst its inner turn passes on the other side of the printed circuit to join a through lead RS11 which is connected to the terminal B15.

The layout is the same in the other half but symmetrical about the vertical axis of the printed circuit plate PC1, between the terminals B17 and B16.

It will, moreover, be observed that apart from their spiral nature, the windings S11 and S12 are substantially concentric with the circles C1 and C2 which will be subsequently pierced to receive (a) the two parts of the magnetic core, shown at CM31 and CM32 in FIG. 8, and (b) the primary windings P1 and P2 which they respectively carry.

Bars, for instance of an aluminium alloy, define the external dimensions of the cores CM31 and CM32 fitted with their respective primary windings.

A series of printed circuit boards PC1 to PCn are fitted on these core bars with their terminals B14, B15, B16, B17 uppermost. The desired connections between the terminals B14, B15, B16, B17 are made by output wires FS which are visible in FIG. 7.

Once these wires FS have been positioned, the assembly is potted to form a resin block 30. 28 and 29 denote cylinders of a synthetic material surrounding the bars (not shown) used as moulding cores.

These cylinders can be put in place before the printed circuit boards.

This operation results in a set of the secondary circuits, moulded in a single block, which gives it extremely stable characteristics at the same time as great reliability, is already set out in detail above.

It is then merely necessary to pass the cores CM31 and CM32, fitted with the primary windings P1 and P2, into the internal openings of the cylinders 28 and 29. The polar end pieces CM34 and CM35 are then positioned to complete the magnetic circuit. The transformer is now finished.

With such a transformer a fly-back power supply, operating at frequencies of 200 KHz or more, can be obtained for high voltages of several tens of kilovolts.

Various modifications in the structure and/or function of the disclosed embodiments may be made by one skilled in the art without departing from the scope of the invention as defined by the claims.

In a particular embodiment, the two windings of one and the same board are placed in series before rectification which provides in all 2n turns (for instance, 20) with a limited space requirement. The two primaries contain substantially the same number of turns, for instance 16 turns each.

It is also possible to rectify the output of each secondary winding, as suggested by the combination of FIGS. 1 and 6. The number of turns of the two primaries is chosen accordingly.

Finally, a variant of the invention, useful if the voltage is not too high, involves obtaining the secondaries and possibly the primaries by engraving the circuits on ceramic substrates, that is to say of the type termed hybrid circuits.

We claim:

1. A high frequency transformer comprising:
(a) a magnetic circuit including at least two generally parallel cores connected by polar pieces;
(b) at least one primary winding wound directly on one of said two parallel cores;
(c) means for driving said primary winding;
(d) a plurality of separate secondary windings magnetically coupled to said primary winding to generate output voltages and comprising flat conductors deposited on an insulating substrate, said insulating substrate carrying two of said secondary windings, each one of said two of said secondary windings being disposed respectively and generally perpendicularly to and around a respective one of said two parallel cores;
(e) electrical circuit means coupled to said secondary windings for providing an output voltage in response to driving of said primary winding; and
(f) a resin block uniting the secondary windings and extending around the cores with a cross-section corresponding to the dimensions of the parallel cores of the magnetic circuit fitted with the primary winding.

2. A transformer according to claim 1, comprising a plurality of insulating substrates carrying said secondary windings wherein said insulating substrates are flat and are separated by electrically insulating plates.

3. A transformer according to claim 1, having a plurality of insulating substrates wherein each substrate includes means for receiving the parallel cores of the magnetic circuit, and support two of said secondary windings which are substantially concentric with the means for receiving the parallel cores of the magnetic circuit.

4. A transformer according to claim 3, wherein the insulating substrate is flat and each secondary winding comprises several turns formed on one side of the substrate and wherein an end of said secondary winding is connected to a return conductor on the other side of the flat insulating substrate.

5. A transformer according to claim 3, wherein the two secondary windings of one and the same substrate are connected in series before rectification.

6. A transformer according to claim 1, wherein said insulating substrates are of the printed circuit type.

7. A transformer according to claim 1, wherein said insulating substrates are of the hybrid circuit type.

8. A transformer as in claim 1, wherein said electrical circuit means comprises means to add the output voltage of said secondary windings.

9. A high frequency transformer comprising:
(a) a magnetic circuit including at least two generally parallel cores connected by polar pieces;
(b) at least one primary winding wound directly on one of said two parallel cores;
(c) means for driving said primary winding;
(d) a plurality of separate secondary windings magnetically coupled to said primary winding to generate output voltages and comprising flat conductors deposited on an insulating substrate, said insulating substrate carrying two of said secondary windings, each one of said two of said secondary windings being disposed respectively and generally perpendicularly to and around a respective one of said two parallel cores;
(e) electrical circuit means coupled to said secondary windings for providing an output voltage in response to driving of said primary winding.

10. A transformer as in claim 9, wherein said electrical circuit means comprises adder means to add the output voltage of said secondary windings.

11. A transformer as in claim 10, wherein said adder means comprises means for serially connecting the outputs of said secondary windings.

12. A transformer as in claim 9, wherein said electrical circuit means comprises rectifier means for rectifying the output of said secondary windings and series connection means for putting the output voltage of said secondary windings in series.

13. A transformer as in claim 12, further comprising a resin block uniting the secondary windings and extending around the core with a cross-section corresponding to the dimensions of the parallel core of the magnetic circuit fitted with the primary winding.

14. A transformer as in claim 9, further comprising a resin block uniting the secondary windings and extending around the core with a cross-section corresponding to the dimensions of the parallel core of the magnetic circuit fitted with the primary winding.

15. A high frequency transformer as claimed in claim 1, wherein said at least one primary winding is wound directly on both of said two parallel cores.

16. A high frequency transformer as claimed in claim 1, wherein at least one primary winding is wound directly on each of said two parallel cores.

17. A high frequency transformer as claimed in claim 9, wherein said at least one primary winding is wound directly on both of said two parallel cores.

18. A high frequency transformer as claimed in claim 9, wherein at least one primary winding is wound directly one each of said two parallel cores.

19. A high frequency transformer comprising:

(a) a magnetic circuit including at least two generally parallel cores connected by polar pieces;

(b) at least one primary winding wound directly on said two parallel cores;

(c) means for driving said primary winding;

(d) a plurality of separate secondary windings magnetically coupled to said primary winding to generate output voltages and comprising flat conductors deposited on an insulating substrate, said insulating substrate carrying two of said secondary windings, each one of said two of said secondary windings being disposed respectively and generally perpendicularly to and around a respective one of said two parallel cores;

(e) electrical circuit means coupled to said secondary windings for providing an output voltage in response to driving of said primary winding.

* * * * *